US009910520B2

(12) United States Patent
Nakamura et al.

(10) Patent No.: US 9,910,520 B2
(45) Date of Patent: Mar. 6, 2018

(54) ELECTRONIC DEVICE

(71) Applicant: KYOCERA CORPORATION, Kyoto (JP)

(72) Inventors: Kotaro Nakamura, Daito (JP); Hayato Mizuno, Osaka (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

(21) Appl. No.: 15/222,369

(22) Filed: Jul. 28, 2016

(65) Prior Publication Data
US 2016/0334897 A1 Nov. 17, 2016

Related U.S. Application Data

(63) Continuation of application No. PCT/JP2015/052471, filed on Jan. 29, 2015.

(30) Foreign Application Priority Data

Jan. 29, 2014 (JP) ................. 2014-014277

(51) Int. Cl.
H05K 5/00 (2006.01)
G06F 3/041 (2006.01)
(Continued)

(52) U.S. Cl.
CPC ............ *G06F 3/041* (2013.01); *G06F 1/1626* (2013.01); *G06F 1/1643* (2013.01);
(Continued)

(58) Field of Classification Search
CPC ...... G06F 3/041; G06F 1/1626; G06F 1/1643; G06F 1/1656; H04M 1/0268; H04M 2250/22

See application file for complete search history.

(56) References Cited

U.S. PATENT DOCUMENTS

2004/0191509 A1 9/2004 Kishioka et al.
2011/0069027 A1* 3/2011 Kim ................... H04M 1/0283
345/173

(Continued)

FOREIGN PATENT DOCUMENTS

JP 2004-231723 A 8/2004
JP 2013-257662 A 12/2013
WO WO 2011/142332 A1 11/2011

OTHER PUBLICATIONS

Written Opinion of the International Searching Authority (Form PCT/ISA/237) and Concise Explanation Thereof in International Patent Application No. PCT/JP2015/052471, dated Feb. 24, 2015, in 11 pages.

(Continued)

Primary Examiner — James Wu
Assistant Examiner — Hung Dang
(74) Attorney, Agent, or Firm — Duane Morris LLP

(57) ABSTRACT

An electronic device according to the present disclosure includes a translucent panel including a front surface and a back surface, the translucent panel including a curved portion at an end portion, the curved portion being curved toward the back surface with respect to a central portion of the translucent panel. The electronic device also includes a touch panel located on the back surface of the translucent panel and configured to be covered with the central portion and the curved portion. The distance between the curved portion and the touch panel is shorter than the distance between the central portion of the translucent panel and the touch panel.

6 Claims, 6 Drawing Sheets

(51) Int. Cl.
*G06F 1/16* (2006.01)
*H04M 1/02* (2006.01)
(52) U.S. Cl.
CPC ........ *G06F 1/1656* (2013.01); *H04M 1/0268* (2013.01); *H04M 2250/22* (2013.01)

(56) References Cited

U.S. PATENT DOCUMENTS

2013/0331150 A1    12/2013  Butsusaka et al.
2014/0139984 A1*   5/2014   Jung .................... G06F 1/1637
                                                        361/679.01

OTHER PUBLICATIONS

International Search Report dated Feb. 24, 2015, in International Patent Application No. PCT/JP2015/052471, in 4 pages.

* cited by examiner

ELECTRONIC DEVICE

CROSS-REFERENCE TO RELATED APPLICATION

The present application is a continuation based on PCT Application No. PCT/JP2015/052471 filed on Jan. 29, 2015, which claims the benefit of Japanese Application No. 2014-014277, filed on Jan. 29, 2014. PCT Application No. PCT/JP2015/052471 is entitled "Front Module for Electronic Device and Electronic Device Equipped with Same", and Japanese Application No. 2014-014277 is entitled "Front Module for Electronic Device and Electronic Device Including the Same," and the contents of each application are incorporated by reference herein in their entireties.

FIELD

The present disclosure relates to an electronic device including a translucent panel including a curved portion at an edge.

BACKGROUND

In an electronic device, such as a mobile phone or a smartphone, a front module is mounted on a casing, the front module including a touch panel and a display as well as a translucent panel made of glass or the like for protecting the touch panel and the display.

SUMMARY

An electronic device according to the present disclosure includes a translucent panel including a front surface and a back surface, the translucent panel including a curved portion at an end portion, the curved portion being curved toward the back surface with respect to a central portion of the translucent panel. The electronic device also includes a touch panel located on the back surface of the translucent panel and configured to be covered with the central portion and the curved portion. The electronic device also includes a casing with an opening in which the translucent panel and the touch panel are mounted. The distance between the curved portion and the touch panel is shorter than the distance between the central portion of the translucent panel and the touch panel.

The foregoing and other objects, features, aspects and advantages of the present disclosure will become more apparent from the following detailed description of the present disclosure when taken in conjunction with the accompanying drawings.

DETAILED DESCRIPTION

Hereinafter, the present disclosure will be described with reference to the drawings.

There is demand for an electronic device in which a touch panel can be attached stably to a translucent panel including a curved portion.

According to the electronic device of the present disclosure, a flexible touch panel does not directly follow the shape of the back surface of the curved portion, but because of its flexibility the vicinity of the edge of the touch panel comes into contact with the vicinity of the end of the curved portion of the translucent panel with a radius of curvature larger than that of the curved portion of the translucent panel. With the increased radius of curvature of the touch panel, breaking of lines due to bending of the touch panel can be suppressed.

Examples of an electronic device 10 to which the present disclosure is applicable can include a mobile phone, such as a smartphone, a tablet computer, a PDA (Personal Digital Assistant), a portable music player, a notebook personal computer, a game machine, and the like. These are not limitations, but any electronic device can be adopted as along as, for example, information can be displayed on a screen thereof and a touch operation can be performed on the screen. Hereinafter, embodiments in which the present disclosure is applied to a smartphone will be described.

Figure 1:
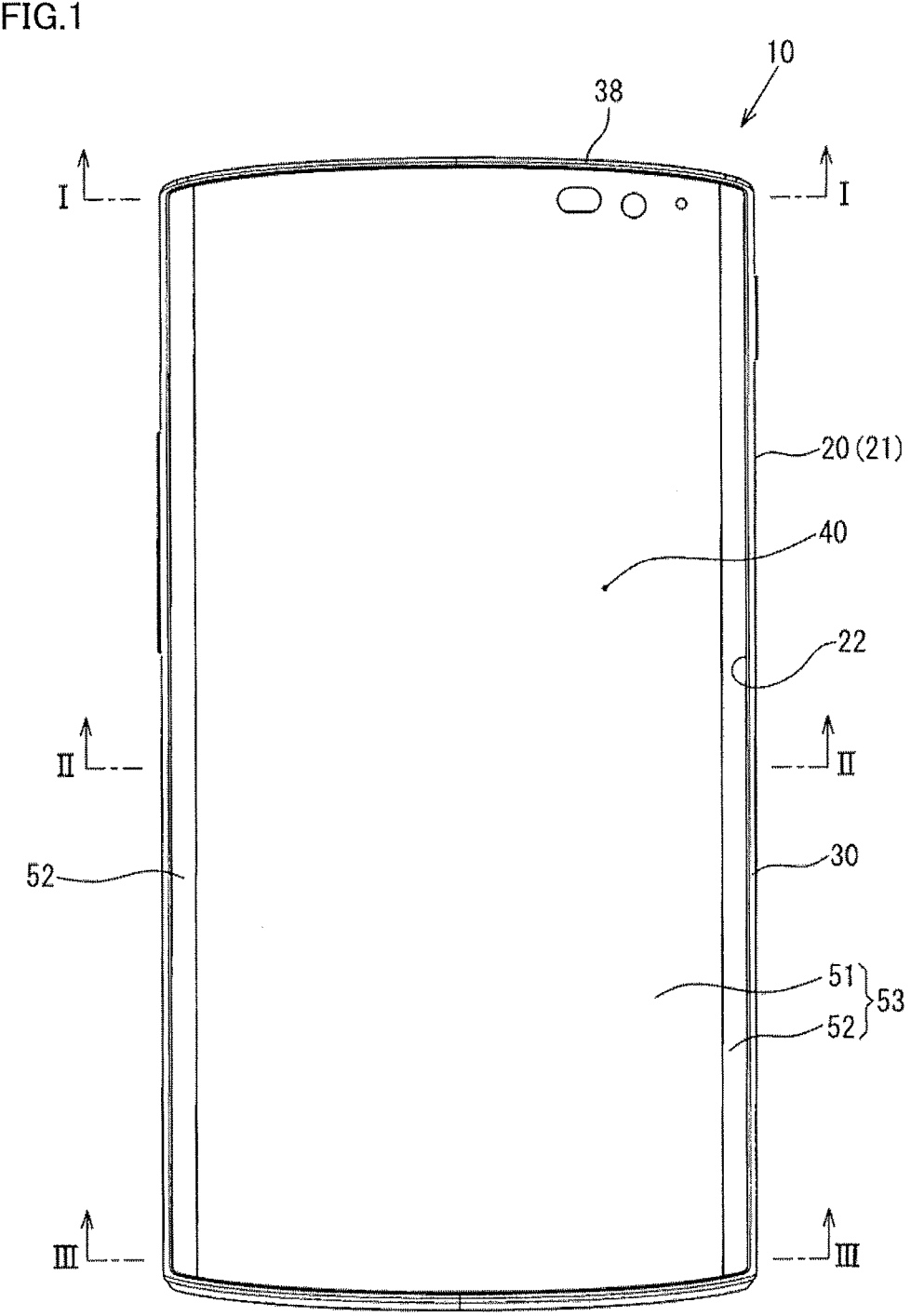
FIG. 1 is a plan view of an electronic device according to the present disclosure.
Figure 2:
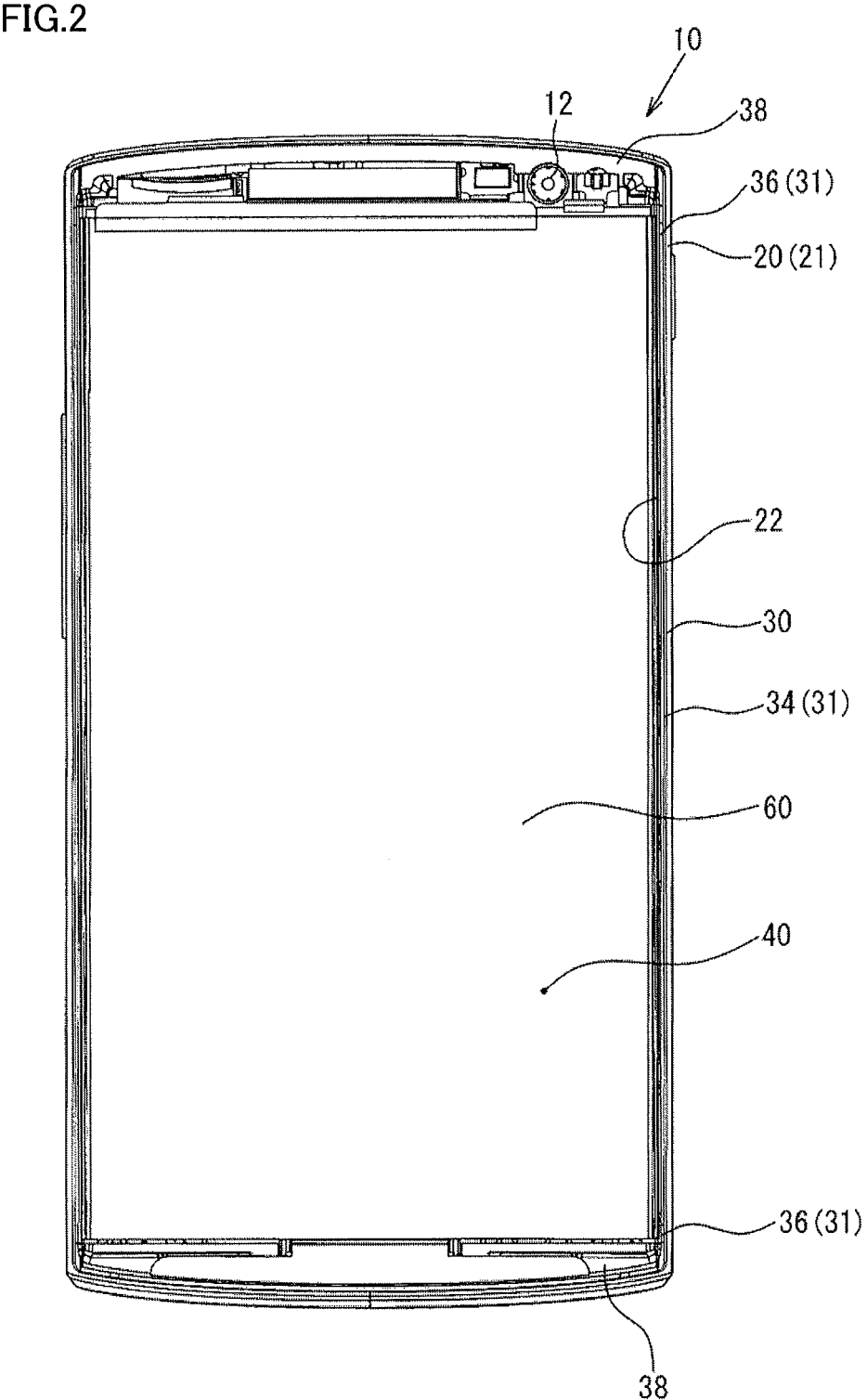
FIG. 2 is a plan view of the electronic device with a translucent panel removed.

FIG. 1 is a front view showing an embodiment of electronic device 10. As shown in the drawing, electronic device 10 is configured such that substantially the whole surface of a casing 20 may be covered with a front unit 40. Front unit 40 visually recognized in FIG. 1 may include a translucent panel 50. FIG. 2 shows a state where translucent panel 50 has been removed from front unit 40 for ease of description.

Figure 3:
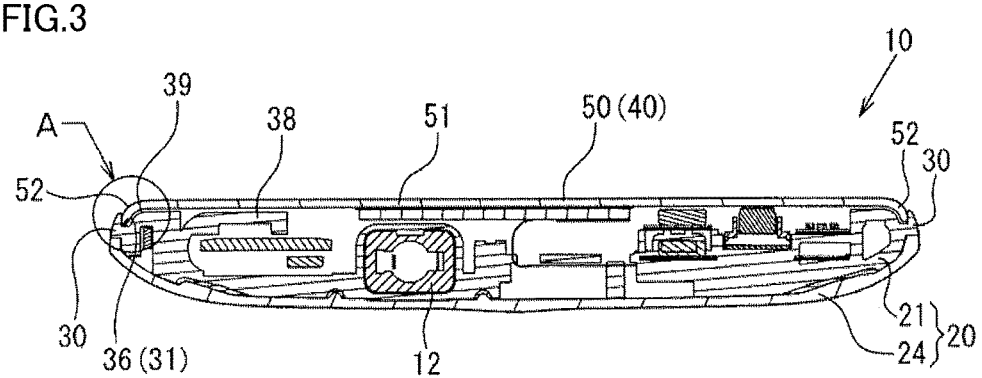
FIG. 3 is a cross sectional view taken along the line I-I shown in FIG. 1.
Figure 4:
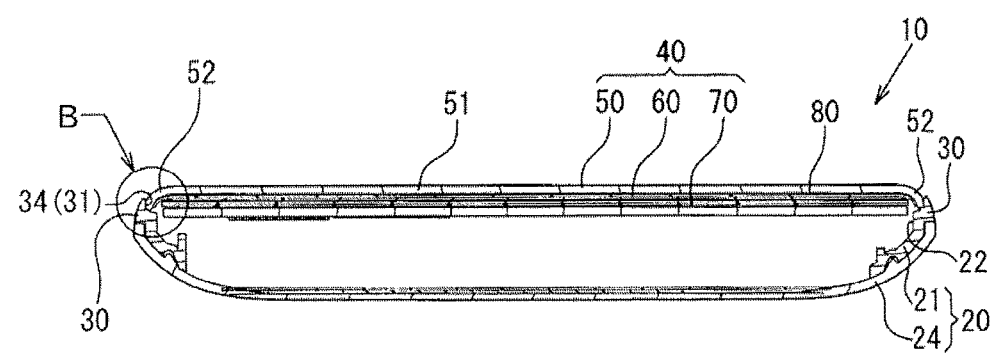
FIG. 4 is a cross sectional view taken along the line II-II shown in FIG. 1.
Figure 5:
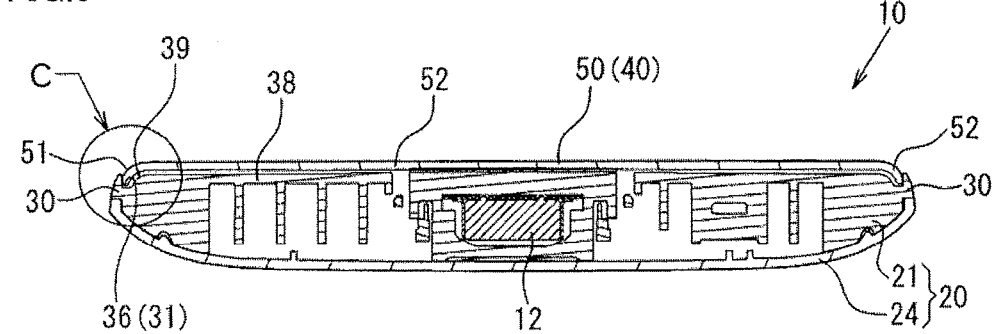
FIG. 5 is a cross sectional view taken along the line III-III shown in FIG. 1.
Figure 6:
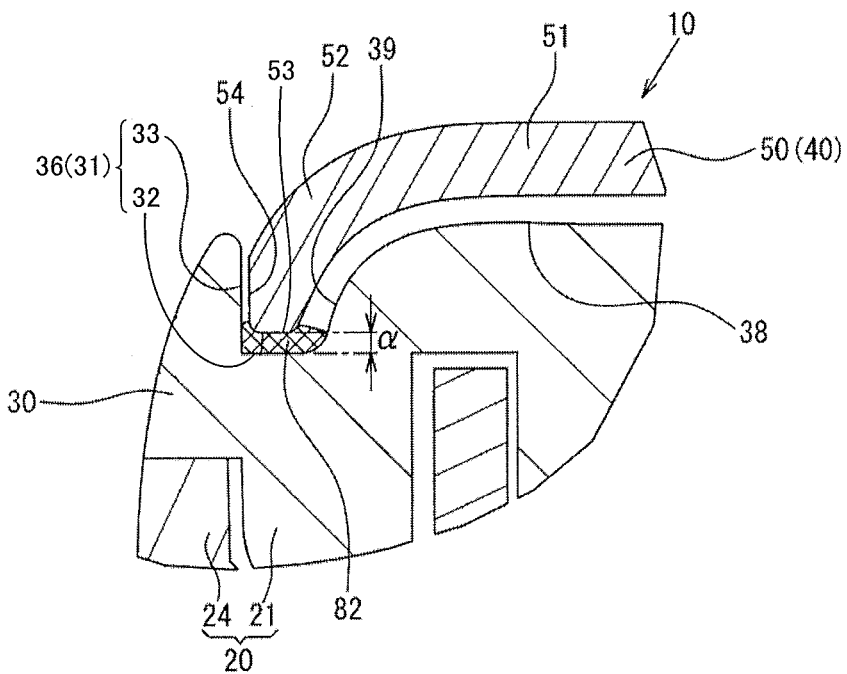
FIG. 6 is an enlarged cross sectional view of a circled part A shown in FIG. 3.
Figure 7:
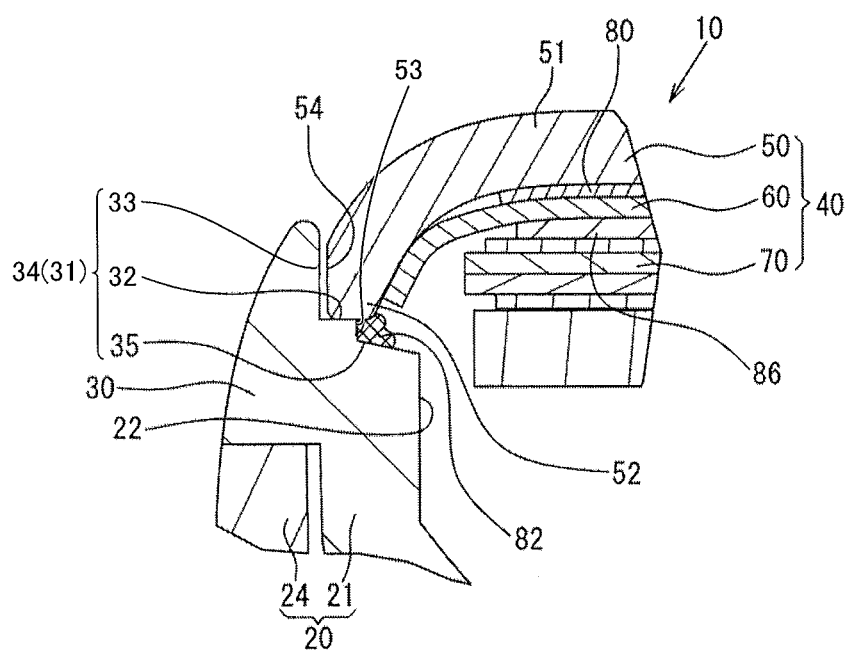
FIG. 7 is an enlarged cross sectional view of a circled part B shown in FIG. 4.
Figure 8:
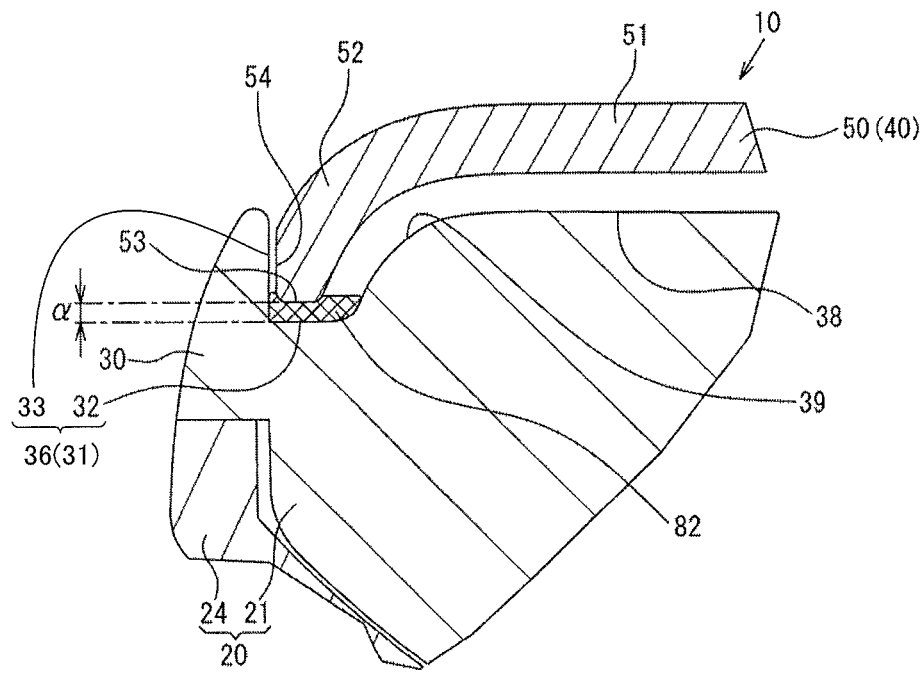
FIG. 8 is an enlarged cross sectional view of a circled part C shown in FIG. 5.

As shown in FIGS. 3 to 5 and their enlarged views FIGS. 6 to 8, front unit 40 may include translucent panel 50 exposed to the outside, a touch panel 60 located at the rear side thereof, and a display 70.

Translucent panel 50 includes a light transmitting panel, and can be formed from glass or resin. Translucent panel 50 serves as a member for protecting touch panel 60 and display 70 which will be described later. When a user touches translucent panel 50, an operation may be performed on touch panel 60. Display 70 may be visually recognized through translucent panel 50 and touch panel 60. Translucent panel 50 may be made of any single crystal material, such as a sapphire panel, that can include a curved portion 52 as will be described later. The sapphire panel may include a panel made of a single crystal material containing alumina ($Al_2O_3$) as a main component. The "main component" may be specifically contained by more than or equal to 50 mass %, preferably more than or equal to 70 mass %. As the material of translucent panel 50, a single crystal having an $Al_2O_3$ purity of more than or equal to approximately 90% is desirable in terms of less susceptibility to scratches and more reliable suppression of cracks, chips and the like.

Besides a sapphire panel, examples of a single crystal material to be employed for translucent panel 50 can include diamond, zirconia, titania, crystal, lithium tantalate, aluminum oxynitride, and the like. As for these materials, a single crystal having a purity of more than or equal to approximately 90% is also preferable in terms of less susceptibility to scratches and more reliable suppression of cracks, chips and the like.

In an embodiment, translucent panel 50 may include a so-called curved panel including curved portion 52 in which the edge side is bent downward from a substantially rectangular flat surface 51 at the central side. Curved portion 52 can be formed by bending a planar glass or a resin thin plate. In the illustrated embodiment, curved portion 52 may be formed to present substantially a quarter circle extending from flat surface 51 and having a substantially constant curvature. In an embodiment, curved portion 52 may be located in proximity to each of the opposed two ends in the longitudinal direction of substantially rectangular translucent panel 50, but can also be formed in proximity to each of the ends in the direction orthogonal to the longitudinal direction, or can also be formed in proximity to only one end. Although the panel having flat surface 51 in proximity to the center is described as an example of translucent panel 50, this is not a limitation in the present disclosure, but the panel may have a curved surface in proximity to the center.

As shown in FIGS. 6 to 8, more specifically, curved portion 52 is bent arcuately downward from flat surface 51, and a lower edge 53 thereof may be cut or polished so as to be substantially parallel to flat surface 51. On the both side edges of translucent panel 50, curved portion 52 may be partly cut or polished to present an edge portion 54 substantially orthogonal to flat surface 51.

Touch panel 60 covering flat surface 51 and curved portion 52 of translucent panel 50 may be located on the rear surface of translucent panel 50. For example, a flexible touch panel can be employed, and can be implemented by arranging electrodes and wires on a transparent flexible substrate. As touch panel 60, a capacitance type or resistive film type panel can be illustrated.

Touch panel 60 may be formed to have a width substantially equal to the length of translucent panel 50 on the rear surface, namely, the length of flat surface 51 and its two curved portions 52 on the rear surface, and to have a length slightly shorter than the length of translucent panel 50. Touch panel 60 may include such a size that it overlaps translucent panel 50 in the width direction but translucent panel 50 protrudes from touch panel 60 in the longitudinal direction.

As shown in FIGS. 4 and 7, touch panel 60 of the above-described configuration may be affixed to translucent panel 50 with an adhesive sheet 80 serving as an adhesive joint. A transparent sheet with an adhesive applied to the both sides thereof, such as an optical clear adhesive (OCA), can be employed as adhesive sheet 80. Besides an adhesive sheet, the adhesive joint may be an adhesive itself.

Adhesive sheet 80 can be substantially rectangular and may be configured to have a width substantially equal to the width of flat surface 51 of translucent panel 50 and to have a length substantially equal to the length of touch panel 60.

By affixing adhesive sheet 80 to flat surface 51 of translucent panel 50 and affixing touch panel 60 to adhesive sheet 80 so as to protrude in the width direction, touch panel 60 can be bonded to translucent panel 50.

Since adhesive sheet 80 is not located at curved portion 52 of translucent panel 50 on this occasion, portions on the both sides of touch panel 60 protruding from adhesive sheet 80 do not fully follow curved portion 52 because of its flexibility, but may be gently curved so that the ends abut on curved portion 52, as shown in FIG. 7. Touch panel 60 may be configured to be closer to translucent panel 50 at the curved portion 52 side than at flat surface 51. In touch panel 60, the radius of curvature of a surface facing curved portion 52 of translucent panel 50 can be made larger than the rear-side radius of curvature of curved portion 52 of translucent panel 50 by the thickness of adhesive sheet 80, which can reduce the occurrence of disconnection due to bending of touch panel 60 at a small radius of curvature.

Adhesive sheet 80 only needs to be located on flat surface 51 of translucent panel 50, which brings another advantage in that the operation of affixing adhesive sheet 80 can be simplified as compared with the case of affixing adhesive sheet 80 even to curved portions 52.

Translucent panel 50 and touch panel 60 may be bonded together by previously affixing adhesive sheet 80 to touch panel 60 and then to translucent panel 50. In this case, the above-described configuration and effects can also be obtained.

As described above, touch panel 60 is located on the rear surfaces of flat surface 51 and curved portions 52 of translucent panel 50. A user can operate electronic device 10 by touching not only flat surface 51 of translucent panel 50 but also curved portions 52, which can increase the operability and operational variations of electronic device 10 as much as possible.

Display 70 may be located on the rear surface of touch panel 60, as shown in FIGS. 4 and 7. A liquid crystal display panel can be employed as display 70, and may be located such that a display surface thereof faces touch panel 60.

A super view resin (SVR) 86 can be interposed between display 70 and touch panel 60, as shown in FIG. 7. By placing the super view resin between display 70 and touch panel 60, an air gap therebetween can be eliminated to increase the visibility and contrast of display 70.

Front unit 40 including translucent panel 50, touch panel 60 and display 70 described above may be attached to casing 20 to form electronic device 10.

Casing 20 has front unit 40 attached to its front side as shown in FIGS. 1 and 2, and a control board for exerting control and the like of electronic device 10, a battery, a memory card, a SIM (Subscriber Identity Module) card, and other electronic components 12 necessary for making communications, phone calls and the like may be stored in casing 20.

For example, casing 20 can be configured to include an inner chassis 21 with an opening 22 formed therein and a back chassis 24 covering the rear surface of inner chassis 21, but the present disclosure is not limited to this. Back chassis 24 may be attachable to/detachable from inner chassis 21, so that a battery, a memory card, a SIM card, or the like can be mounted and replaced, for example.

In an embodiment, front unit 40 may be attached to inner chassis 21. More specifically, front unit 40 may be attached to inner chassis 21 with display 70 fitted into opening 22 formed in inner chassis 21 and the tip of curved portion 52 of translucent panel 50 fitted into a recess 31 serving as an attaching surface formed in inner chassis 21. The attaching surface is not limited to recess 31, but may have a flat or projecting shape.

Inner chassis 21 can be a frame-like chassis having formed therein substantially rectangular opening 22 within which display 70 is to be fitted. In inner chassis 21, recess 31 is formed, and opening 22 within which display 70 is to be fitted may be formed by a narrow frame part 30 extending in the longitudinal direction and a connection part 38 which links the ends of frame part 30.

As will be described later, an adhesive 82 like a thermosetting resin, such as an epoxy resin, may be applied to recess 31, and a double-faced tape may be affixed to connection part 38 for attaching translucent panel 50.

More specifically, recess 31 may be located in the longitudinal direction of frame part 30 as shown in FIGS. 2, 4 and 7. Recess 31 may be located adjacent to opening 22. In the illustrated embodiment, recess 31 may have a bottom surface 32 extending in the longitudinal direction and an outer wall 33 on the peripheral side of frame part 30. Outer wall 33 may be located upright substantially perpendicularly to bottom surface 32, and edge portion 54 of translucent panel 50 may abut on outer wall 33.

A recess end 36 which is an end of recess 31 serving as the attaching surface may be located at connection part 38 as shown in FIGS. 2, 3, 5, 6, and 8. Hereinafter, in recess 31, a portion between recess ends 36, namely, a portion formed in frame part 30 of recess 31 will be called a middle portion 34.

As understood from the comparison among FIGS. 6 to 8, bottom surface 32 of recess end 36 of recess 31 may be deeper than bottom surface 32 of middle portion 34. When attaching translucent panel 50 in which lower edge 53 of curved portion 52 is straight, bottom surface 32 of middle portion 34 shown in FIG. 7 abuts on lower edge 53 of curved portion 52, and at recess end 36 shown in FIGS. 6 and 8, the distance between lower edge 53 of curved portion 52 and bottom surface 32 at recess 31 may be increased to ensure a clearance α.

Bottom surface 32 of middle portion 34 may be adjacent to a stepped portion 35 recessed downward toward the inner side of inner chassis 21 as shown in FIG. 7. With this configuration, bottom surface 32 does not fully abut on lower edge 53 of curved portion 52 of translucent panel 50 in the width direction, but lower edge 53 of curved portion 52 may be unsupported on its inner side.

At recess end 36, the end surface of connection part 38 may serve as an inner sidewall 39 of inner chassis 21. Sidewall 39 is not formed upright substantially perpendicularly to the bottom of recess 31, but can be inclined to be higher toward the inner side as shown in FIGS. 6 and 8.

Various electronic components 12 are mounted on connection part 38 as shown in FIG. 2, and the both ends of connection part 38 may each serve as sidewall 39 raised from bottom surface 32 of recess end 36 described above. A double-faced tape not shown can be affixed to connection part 38 at one or several places for bonding a portion of translucent panel 50 protruding from touch panel 60.

The attachment of front unit 40 to inner chassis 21 of the above-described configuration can be performed in the following manner.

First, adhesive 82 can be applied to recessed bottom surface 32 of inner chassis 21 in stripes, while a double-faced tape is affixed to connection part 38. Front unit 40 is brought closer to inner chassis 21 with display 70 facing down, and display 70 can be inserted and pushed into the opening as it is.

Edge portion 54 of translucent panel 50 may be thereby guided to outer wall 33 of recess 31, so that curved portion 52 may enter recess 31. Bottom surface 32 of recess 31 and lower edge 53 of curved portion 52 may be brought closer to or abut on each other, and adhesive 82 on bottom surface 32 may be spread to bond lower edge 53 of curved portion 52 and bottom surface 32 of recess 31 as shown in FIGS. 6 to 8. Flat surface 51 of translucent panel 50 and connection part 38 may be affixed together with the double-faced tape.

When adhesive 82 is hardened, the attachment of front unit 40 to inner chassis 21 can be completed. Thereafter, mounting and electric connection of necessary electronic components 12 are conducted, and back chassis 24 may be fitted into inner chassis 21 to manufacture electronic device 10.

According to the present disclosure, recess 31 is formed such that recess end 36 is deeper than middle portion 34 as described above. Even if warpage occurs at curved portion 52 of translucent panel 50 when forming curved portion 52 by bending or the like, such warpage can be absorbed by recess end 36 and can reduce the likelihood that translucent panel 50 will be attached with an inclination.

In recess 31, it is suitable to form bottom surface 32 of recess end 36 to be deeper than bottom surface 32 of middle portion 34 such that clearance α (see FIGS. 6 and 8) ranges from 0.1 mm to 0.4 mm.

In recess 31, bottom surface 32 of middle portion 34 has stepped portion 35 recessed toward the inner side as shown in FIG. 7. When applying adhesive 82 to the bottom surface of middle portion 34, excessive adhesive 82 does not remain at middle portion 34, but may flow to stepped portion 35. It is possible to reduce the likelihood that excessive adhesive 82 will overflow to the edge portion 54 side of translucent panel 50 to impair the appearance of electronic device 10. Adhesive 82 flown to stepped portion 35 may remain at stepped portion 35 to bond stepped portion 35 and lower edge 53 of curved portion 52.

Since recess end 36 has its inner sidewall 39 inclined as shown in FIGS. 6 and 8, the bottom area of recess end 36 can be made smaller than in the case of forming inner sidewall 39 of recess end 36 so as to be substantially orthogonal to flat surface 51 of translucent panel 50. As a result, it is possible to reduce the likelihood that adhesive 82 applied to recess end 36 will spread. Effective adhesion can be accomplished with a small amount of adhesive 82. This configuration particularly ensures the watertightness of translucent panel 50 and recess end 36.

Specifically, it is appropriate to form sidewall 39 in a curved shape projecting toward curved portion 52 of translucent panel 50, and as shown in FIGS. 6 and 8, it is more desirable to form sidewall 39 in a curved shape having a curvature substantially equal to the rear-side curvature of curved portion 52 of translucent panel 50. This can further improve the above-described effects. When a single crystal material, such as a sapphire panel, is used for translucent panel 50, cracking of translucent panel 50 can be suppressed in addition to the above-described effects. It is more appropriate to form sidewall 39 in a curved shape having a curvature substantially equal to the rear-side curvature of curved portion 52 of translucent panel 50. A single crystal material, such as a sapphire panel, may include a material that is less susceptible to deformation than a glass panel. When a single crystal material, such as a sapphire panel, is used for translucent panel 50, and when a load is applied to a portion where translucent panel 50 is not supported firmly from the rear side of the panel, the portion of translucent panel 50 to which the load has been applied is less susceptible to deformation, and translucent panel 50 may thus be broken at a load smaller than in the case where translucent panel 50 is made of glass. By supporting the rear surface of translucent panel 50 with sidewall 39 as described above, cracking can be suppressed. In that case, a smaller clearance between sidewall 39 and translucent panel 50 is preferable, and translucent panel 50 and sidewall 39 are preferably in contact with each other.

With the above-described configuration, the corner of curved portion 52 of translucent panel 50 which is susceptible to shock when electronic device 10 is dropped, for example, is pressed by sidewall 39 from the inner side, which brings an advantage that a stress that would be caused by such a shock can be eased.

Merely by bonding translucent panel 50 and flexible touch panel 60 by affixing adhesive sheet 80 serving as an adhesive joint only to flat surface 51 as shown in FIG. 7, touch panel 60 may be separated from curved portion 52. Particularly since touch panel 60 is bent by abutting on curved portion 52, adhesive sheet 80 in proximity to curved portion 52 may peel off due to the restoring force of touch panel 60.

Figure 9:
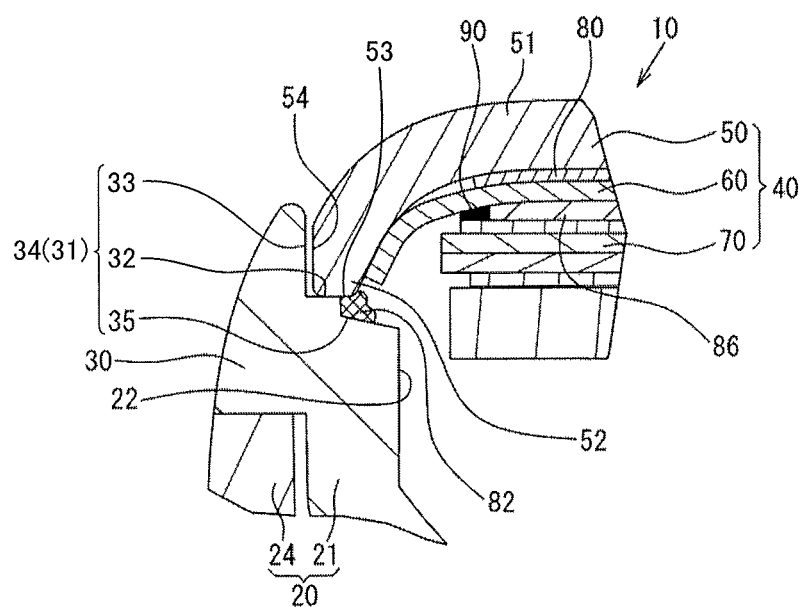
FIG. 9 is an enlarged cross sectional view of circled part B shown in FIG. 4, showing another embodiment of the present disclosure.

In this case, as shown in FIG. 9, a rubber-like elastic member 90, such as a sponge or silicone rubber, may be inserted between the peripheral surface of touch panel 60 and the display 70 in proximity to curved portion 52 and flat surface 51 of translucent panel 50 to reduce the likelihood that touch panel 60 will be separated from the translucent panel 50. With this configuration, touch panel 60 is pressed against flat surface 51 of translucent panel 50 to maintain the affixing force of adhesive sheet 80, which can reduce the likelihood that touch panel 60 will peel off.

Figure 10:
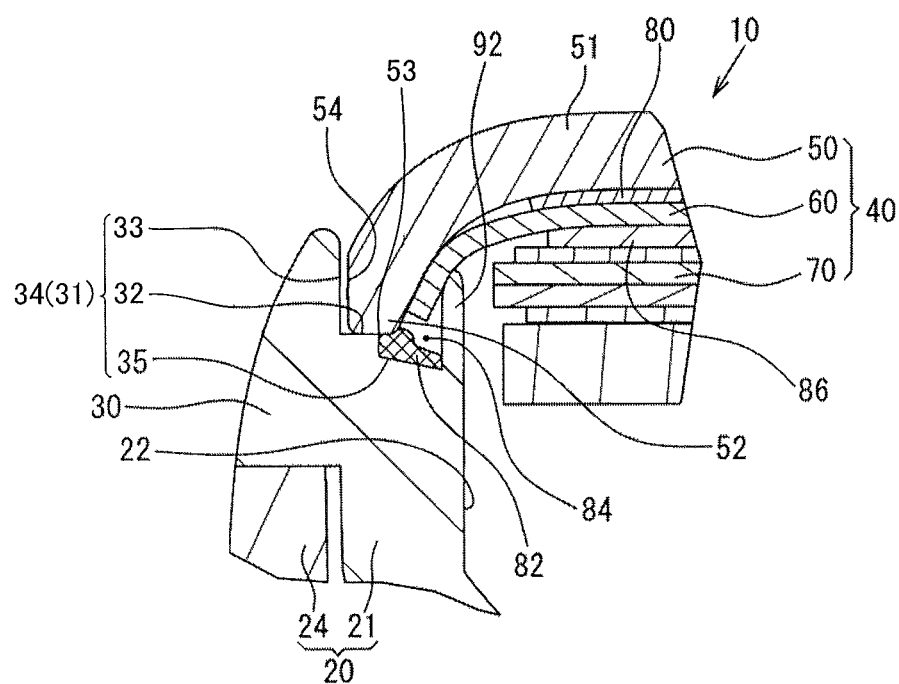
FIG. 10 is an enlarged cross sectional view of circled part B shown in FIG. 4, showing still another embodiment of the present disclosure.

As shown in FIG. 10, inner chassis 21 may also have a rib 92 arranged upright from bottom surface 32 or stepped portion 35 of middle portion 34 of recess 31 toward curved portion 52 to push up touch panel 60 of curved portion 52 from below with front unit 40 being attached. Rib 92 can be formed on the periphery of opening 22. Curved portion 52 of touch panel 60 can thus be pressed by rib 92 and the likelihood of being separated can be reduced, thereby maintaining the affixing force of adhesive sheet 80. When a single crystal material, such as a sapphire panel, is used for translucent panel 50, it is more appropriate to form rib 92 since cracking of translucent panel 50 can be suppressed in addition to the above-described effects. A single crystal material, such as a sapphire panel, has a property less susceptible to deformation. When a single crystal material, such as a sapphire panel, is used for translucent panel 50, and when a load is applied to a portion where translucent panel 50 is not supported firmly, the portion of translucent panel 50 to which the load has been applied is less susceptible to deformation, and may be broken. By supporting the rear surface of translucent panel 50 with rib 92, cracking can be suppressed.

Rib 92 can also be formed along the entire length of middle portion 34, or may be formed to project from one or several places of middle portion 34. At the bottom of middle portion 34, stepped portion 35 described above can also be formed next to rib 92. If rib 92 is formed along the entire length of middle portion 34, and when lower edge 53 of curved portion 52 of translucent panel 50 and bottom surface 32 of middle portion 34 are bonded as shown in FIG. 10, rib 92 can reduce the likelihood that excessive adhesive 82 will flow out, thereby forming an adhesive pool 84 on stepped portion 35. It is thus possible to reduce the likelihood that excessive adhesive 82 will flow to the inner side of inner chassis 21. Adhesive 82 held back with rib 92 bonds inner chassis 21 and lower edge 53 of curved portion 52 of translucent panel 50, and can increase the bond strength.

It should be understood that the embodiments disclosed herein are illustrative and non-restrictive in every respect. The scope of the present disclosure is defined by the claims not by the description above, and is intended to include any modification within the meaning and scope equivalent to the terms of the claims.

For example, the order of assembling front unit 40 and its configuration, the order of assembling inner chassis 21 and its configuration, the configuration of electronic device 10, and the like are not limited to the above-described embodiment.

Although the present disclosure has been described and illustrated in detail, it is clearly understood that the same is by way of illustration and example only and is not to be taken by way of limitation, the scope of the present disclosure being interpreted by the terms of the appended claims.

The invention claimed is:

1. An electronic device comprising:
    a translucent panel comprising a front surface and a back surface, the translucent panel comprising a first curved end portion and a first planar central portion formed integrally with the first curved end portion, wherein the first curved end portion curves toward a back surface of the first planar central portion;
    a touch panel located adjacent to the back surface of the translucent panel and having a second curved end portion having a front surface located adjacent to a back surface of the first curved end portion and a second planar central portion having a front surface located adjacent to the back surface of the first planar central portion; and
    a casing with an opening in which the translucent panel and the touch panel are mounted,
    wherein a distance between the back surface of the first curved end portion and a front surface of the second curved end portion is shorter than a distance between the back surface of the first planar central portion and the front surface of the second planar central portion.

2. The electronic device according to claim 1, further comprising an adhesive portion configured to affix the front surface of the second planar central portion of the touch panel to the back surface of the first planar central portion of the translucent panel, wherein the adhesive portion is not located between the back surface of the first curved end portion of the translucent panel and the front surface of the second curved end portion of the touch panel.

3. The electronic device according to claim 1, wherein a radius of curvature of the second curved end portion is larger than a radius of curvature of the first curved end portion.

4. The electronic device according to claim 1, further comprising:
    a display panel located adjacent to the back surface of the second planar central portion of the touch panel and facing the second planar central portion; and
    an elastic member located between the touch panel and the display panel at a position adjacent to the back surface of the second curved end portion.

5. The electronic device according to claim 1, further comprising:
    a rib located on the casing and pressing the touch panel toward the back surface of the translucent panel.

6. The electronic device according to claim 5, further comprising:
    an adhesive between the casing and the translucent panel; and
    a stepped portion located on the casing between the rib and the adhesive.

* * * * *